United States Patent
Johannsen

(10) Patent No.: US 9,942,349 B2
(45) Date of Patent: *Apr. 10, 2018

(54) INCREMENTAL BROWSER-BASED DEVICE FINGERPRINTING

(71) Applicant: BLUECAVA, INC., Irvine, CA (US)

(72) Inventor: Eric A. Johannsen, San Juan Capistrano, CA (US)

(73) Assignee: BLUECAVA, INC., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/591,468

(22) Filed: Jan. 7, 2015

(65) Prior Publication Data

US 2015/0127825 A1 May 7, 2015

Related U.S. Application Data

(63) Continuation of application No. 14/035,580, filed on Sep. 24, 2013, now Pat. No. 8,954,560, which is a
(Continued)

(51) Int. Cl.
*G06F 15/16* (2006.01)
*H04L 29/08* (2006.01)
(Continued)

(52) U.S. Cl.
CPC ............ *H04L 67/303* (2013.01); *G06F 21/44* (2013.01); *H04L 41/0853* (2013.01);
(Continued)

(58) Field of Classification Search
CPC ... H04L 67/22; H04L 63/0876; H04L 63/102; H04N 21/25833; G06F 21/44
See application file for complete search history.

(56) References Cited

U.S. PATENT DOCUMENTS

| 6,363,479 B1 | 3/2002 | Godfrey et al. |
| 7,103,779 B2 | 9/2006 | Kiehtreiber et al. |
| (Continued) | | |

OTHER PUBLICATIONS

U.S. Appl. No. 13/290,549, (U.S. Pat. No. 8,601,109), filed Nov. 7, 2011 (Dec. 3, 2013).
(Continued)

*Primary Examiner* — Farid Homayounmehr
*Assistant Examiner* — Christopher C Harris
(74) *Attorney, Agent, or Firm* — Baker Botts L.L.P.

(57) ABSTRACT

A method for incrementally fingerprinting a computing device includes steps for executing device-identification code programmed to retrieve a complete set of device configuration metrics from a web browser of the computing device, interrupting execution of the device-identification code after retrieval of a first subset of the device configuration metrics, generating a partial device fingerprint from the first subset, generating a temporary device identifier from the partial device fingerprint, and generating a subset indicator identifying the device configuration metrics that compose the first subset. Additional steps include writing the temporary device identifier and the subset indicator to browser-based storage of the computing device, resuming execution of the device-identification code, querying the browser-based storage for presence of the temporary device identifier, and retrieving, responsive to detecting the temporary device identifier, a second subset of the device configuration metrics, the second subset comprising device configuration metrics not identified by the subset indicator.

16 Claims, 9 Drawing Sheets

Related U.S. Application Data continuation of application No. 13/290,549, filed on Nov. 7, 2011, now Pat. No. 8,601,109.

(60) Provisional application No. 61/410,815, filed on Nov. 5, 2010.

(51) Int. Cl.

| | | |
|---|---|---|
| *G06F 21/44* | (2013.01) | |
| *H04L 29/06* | (2006.01) | |
| *H04L 12/24* | (2006.01) | |
| *H04L 12/26* | (2006.01) | |

(52) U.S. Cl.
CPC .......... *H04L 43/04* (2013.01); *H04L 63/0876* (2013.01); *H04L 67/02* (2013.01); *H04L 63/168* (2013.01)

(56) References Cited

U.S. PATENT DOCUMENTS

| | | | |
|---|---|---|---|
| 7,493,388 B2 | 2/2009 | Wen et al. | |
| 7,584,347 B2* | 9/2009 | El-Haj-mahmoud | G06F 9/4408 713/1 |
| 8,438,184 B1 | 5/2013 | Wang et al. | |
| 2002/0035622 A1 | 3/2002 | Barber | |
| 2003/0009443 A1 | 1/2003 | Yatviskiy | |
| 2004/0044799 A1 | 3/2004 | Sivaraman et al. | |
| 2005/0204129 A1 | 9/2005 | Sudia et al. | |
| 2006/0010072 A1* | 1/2006 | Eisen | G06F 21/73 705/44 |
| 2006/0048211 A1* | 3/2006 | Pierson | H04L 63/0876 726/3 |
| 2007/0234409 A1* | 10/2007 | Eisen | H04L 63/0876 726/6 |
| 2007/0250627 A1 | 10/2007 | May et al. | |
| 2007/0250716 A1 | 10/2007 | Brunk et al. | |
| 2007/0288751 A1 | 12/2007 | Rits | |
| 2008/0133420 A1* | 6/2008 | Barber | G06Q 10/00 705/75 |
| 2008/0196095 A1 | 8/2008 | Sheynblat et al. | |
| 2009/0089869 A1 | 4/2009 | Varghese | |
| 2009/0258637 A1 | 10/2009 | Liu et al. | |
| 2009/0276619 A1 | 11/2009 | Collens et al. | |
| 2009/0292816 A1 | 11/2009 | Etchegoyen et al. | |
| 2010/0037046 A1 | 2/2010 | Ferg et al. | |
| 2010/0180116 A1 | 7/2010 | Coan et al. | |
| 2010/0229224 A1* | 9/2010 | Etchegoyen | G06F 21/31 726/5 |
| 2010/0293094 A1* | 11/2010 | Kolkowitz | G06Q 20/40 705/44 |
| 2010/0299434 A1* | 11/2010 | Hanson | G06Q 30/02 709/224 |
| 2010/0305989 A1* | 12/2010 | Mu | G06Q 10/0635 705/7.28 |
| 2010/0333081 A1 | 12/2010 | Etchegoyen | |
| 2011/0093503 A1* | 4/2011 | Etchegoyen | G06F 21/121 707/780 |
| 2011/0099480 A1* | 4/2011 | Sama | G06F 21/00 715/736 |
| 2011/0185016 A1* | 7/2011 | Kandasamy | G06Q 30/02 709/203 |
| 2011/0218877 A1 | 9/2011 | Barber | |
| 2011/0288940 A1* | 11/2011 | Horadan | F16K 31/0634 705/14.69 |
| 2011/0295908 A1* | 12/2011 | To | G06F 21/31 707/803 |
| 2011/0296038 A1 | 12/2011 | Mandre | |
| 2012/0036264 A1 | 2/2012 | Jiang et al. | |
| 2012/0072546 A1* | 3/2012 | Etchegoyen | G06F 17/30241 709/219 |
| 2013/0339532 A1 | 12/2013 | Nelson et al. | |
| 2014/0164418 A1 | 6/2014 | Etchegoyen | |
| 2014/0172429 A1 | 6/2014 | Butcher et al. | |
| 2014/0181488 A1 | 6/2014 | Sama et al. | |

OTHER PUBLICATIONS

U.S. Appl. No. 14/035,580, (U.S. Pat. No. 8,954,560), filed Sep. 24, 2013 (Feb. 10, 2015).
U.S. Appl. No. 13/290,549, Oct. 30, 2013 Issue Fee Payment.
U.S. Appl. No. 13/290,549, Sep. 5, 2013 Notice of Allowance.
U.S. Appl. No. 13/290,549, Jun. 6, 2013 Response to Non-Final Office Action.
U.S. Appl. No. 13/290,549, Apr. 1, 2013 Non-Final Office Action.
U.S. Appl. No. 14/035,580, Jan. 7, 2015 Issue Fee Payment.
U.S. Appl. No. 14/035,580, Oct. 8, 2014 Notice of Allowance.
International Search Report and Written Opinion for PCT/US2011/59548, dated Feb. 15, 2012 (corresponding to U.S. Appl. No. 13/290,549).

* cited by examiner

INCREMENTAL BROWSER-BASED DEVICE FINGERPRINTING

CROSS-REFERENCE TO RELATED APPLICATIONS

The present application is a continuation of U.S. application Ser. No. 14/035,580, filed on Sep. 24, 2013, which is a continuation of U.S. application Ser. No. 13/290,549, filed on Nov. 7, 2011, now U.S. Pat. No. 8,601,109, which claims priority to U.S. Provisional Application No. 61/410,815 filed Nov. 5, 2010, the disclosure of which is hereby incorporated by reference in its entirety.

BACKGROUND OF THE INVENTION

Field of the Invention

The present invention is directed to methods and apparatus for uniquely identifying remote computing devices. More specifically, the invention is directed to fingerprinting a remote computing device in stages using information retrievable from a web browser.

Description of the Related Art

Device identification is used in network communications, for example, to allow a server to uniquely identify remote computing devices that request access to information or services available through the server. There are many applications for device identification, including security, remote licensing of software, and targeted advertising of web-deliverable content, to name a few.

Device identification may involve collecting information from a remote computing device to generate a "fingerprint" for the device. A device fingerprint, as the name implies, consists of computer-readable code that uniquely identifies a computing device. Any computing device capable of communicating with other computing devices, for example, a laptop computer or mobile phone equipped for Internet communications, may be uniquely fingerprinted using methods known to the assignee of the present application and disclosed in U.S. Pat. No. 5,490,216, U.S. patent application Ser. Nos. 11/531,235 and 11/531,257 filed Sep. 12, 2005, and U.S. patent application Ser. Nos. 12/903,948 and 12/903,980 filed Oct. 13, 2010, all of which are fully incorporated herein by reference.

Device-based fingerprinting works by collecting device identification metrics (also known as indicators or computer-readable parameters) from a target device, for example, data stored on the device that represents an manufacturer-provided identification number, manufacturer name, serial number, version number, or performance specification, for hardware devices installed on or peripheral to the device, or other user-configurable or non-user-configurable parameters. Another type of device fingerprinting, web-based or browser-based fingerprinting, works by collecting indicators from data accessible from a web browser running on the target device. In either case, a special program may be executed to collect the data, and may be resident in device-based storage, i.e., memory stored locally on the device, or the program may be run at a server remote from the target device that queries the target device for parameters accessible to the server, for example, via a web browser running on the target device. When the fingerprint is taken, a unique identification code based on the fingerprint may be stored locally on the target device, for example, as a flash cookie. In subsequent transactions committed by the same target device, a server may quickly and easily identify the device by reading the unique identification code, without having to re-fingerprint the device.

The fingerprinting program may often be attached to a web page, and run in the background while a target or client device visits the website to browse or to effect some transaction. A problem that often arises when a browser-based fingerprinting program runs from a web page is that it takes some amount of time to collect all of the indicators that are needed to establish a unique identity for the target device. This may cause undesirable loading delays when displaying the web page, which can be too slow for many market applications, or can otherwise detract from a visitor's experience or even drive the visitor away. When visitors navigate away from a web page before the fingerprinting indicators have been collected, it may not be possible to establish a unique identifier for the target device.

Browser-based fingerprinting can be further complicated by target devices equipped with multiple browsers. Such a device, initially fingerprinted when running a first browser, may appear to the fingerprinting program to be a different device when running a second browser. The process of web-based device fingerprinting, therefore, must collect sufficient indicators to uniquely identify a device, must run fast enough to meet a host's timing expectations, and must be able to verify the identity of a device previously fingerprinted, regardless of which browser is running. The timing difficulties and the problems presented by multiple browsers need to be overcome before device fingerprinting can be made attractive for wide scale use.

SUMMARY OF THE INVENTION

The present invention addresses the difficulties just described by providing a method for incrementally fingerprinting a computing device, so that the indicators needed to generate the fingerprint may be collected at different times or during different sessions and later consolidated. Device-identification code that collect the indicators from a web browser may be customized according to the invention so that no single indicator-collection event causes a loading delay that exceeds the specifications of a web page host.

In one embodiment, a method according to the invention for incremental device fingerprinting includes an initial step for executing from a website, responsive to the website receiving a resource request through a web browser of a computing device, device-identification code for identifying the computing device, the device-identification code programmed to retrieve a complete set of device configuration metrics from the web browser. Subsequent steps of the method include interrupting execution of the device-identification code after retrieval of a first subset of the device configuration metrics, generating a partial device fingerprint from the first subset of device configuration metrics, generating a temporary device identifier from the partial device fingerprint, and generating a subset indicator identifying the device configuration metrics that compose the first subset. Once this data is generated, additional steps are performed for: writing the temporary device identifier and the subset indicator to browser-based storage of the computing device, resuming execution of the device-identification code, querying the browser-based storage for presence of the temporary device identifier, and retrieving, responsive to detecting the temporary device identifier, a second subset of the device configuration metrics, the second subset comprising device configuration metrics not identified by the subset indicator. A final step for updating the partial device fingerprint responsive to retrieving the second subset of the device configuration metrics may complete the method.

In another embodiment, upon resuming execution of the device-identification code, the method may further include querying the browser-based storage for the subset indicator, and if the subset indicator indicates that all device configuration metrics in the set have been retrieved, omitting further retrieving steps, and promoting the temporary device identifier to a permanent device identifier. Promoting the temporary device identifier to permanent may be achieved by marking the subset indicator as permanent in the browser-based storage, and by writing data presently stored as the temporary device identifier to device-based storage on the computing device in a location reserved for the permanent device identifier.

In another implementation of the invention for incremental device fingerprinting, a method for generating a browser-based fingerprint for a computing device is embodied in executable device-identification code. The device-identification code is deployed for execution from a website in response to the website receiving a resource request through a web browser running on the computing device. When executed, the device-identification code performs the following method steps: (a) querying browser-based storage of the requesting web browser for a permanent device identifier indicator, (b) in response to returning no permanent device identifier indicator, retrieving from the requesting web browser a subset of a complete set of device configuration metrics, (c) generating a partial device fingerprint from all device configuration metrics previously retrieved from the requesting web browser, (d) generating a temporary device identifier from the partial device fingerprint, (e) generating a temporary device identifier indicator identifying all device configuration metrics previously retrieved from the requesting web browser, (t) writing the temporary device identifier and the temporary device identifier indicator to the browser-based storage, (g) re-performing the steps beginning at step (a) to retrieve device configuration metrics not previously retrieved until the requesting web browser exits the web page or until the complete set of device configuration metrics has been retrieved. When the complete set of device configuration metrics has been retrieved, additional method steps are executed for: (h) generating a complete device fingerprint from the complete set of device configuration metrics, (i) generating a permanent device identifier from the full device fingerprint, (j) writing the permanent device identifier to device-based storage on the computing device, and (j) writing a permanent device identifier indicator to the browser-based storage. The method may be further characterized in that an initial subset may consist of those device configuration metrics that satisfy the following conditions: (i) the metrics are retrievable from the web browser within a time period specified by the website, and (ii) the metrics provide the highest probability among all subsets satisfying condition (i) of uniquely identifying the computing device.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. In the drawings, like reference numerals designate like parts throughout the different views, wherein:

DETAILED DESCRIPTION

The present invention provides a method for fingerprinting a computing device in a stages using information obtainable from a special computer program running within a browser of the computing device. The invention discloses an incremental browser-based fingerprinting program that typically runs while the computing device is downloading a web page. The program avoids causing prolonged loading delays by providing the capability for distributing the total execution time needed to extract a complete set of fingerprinting metrics over multiple browsing sessions.

Figure 1:
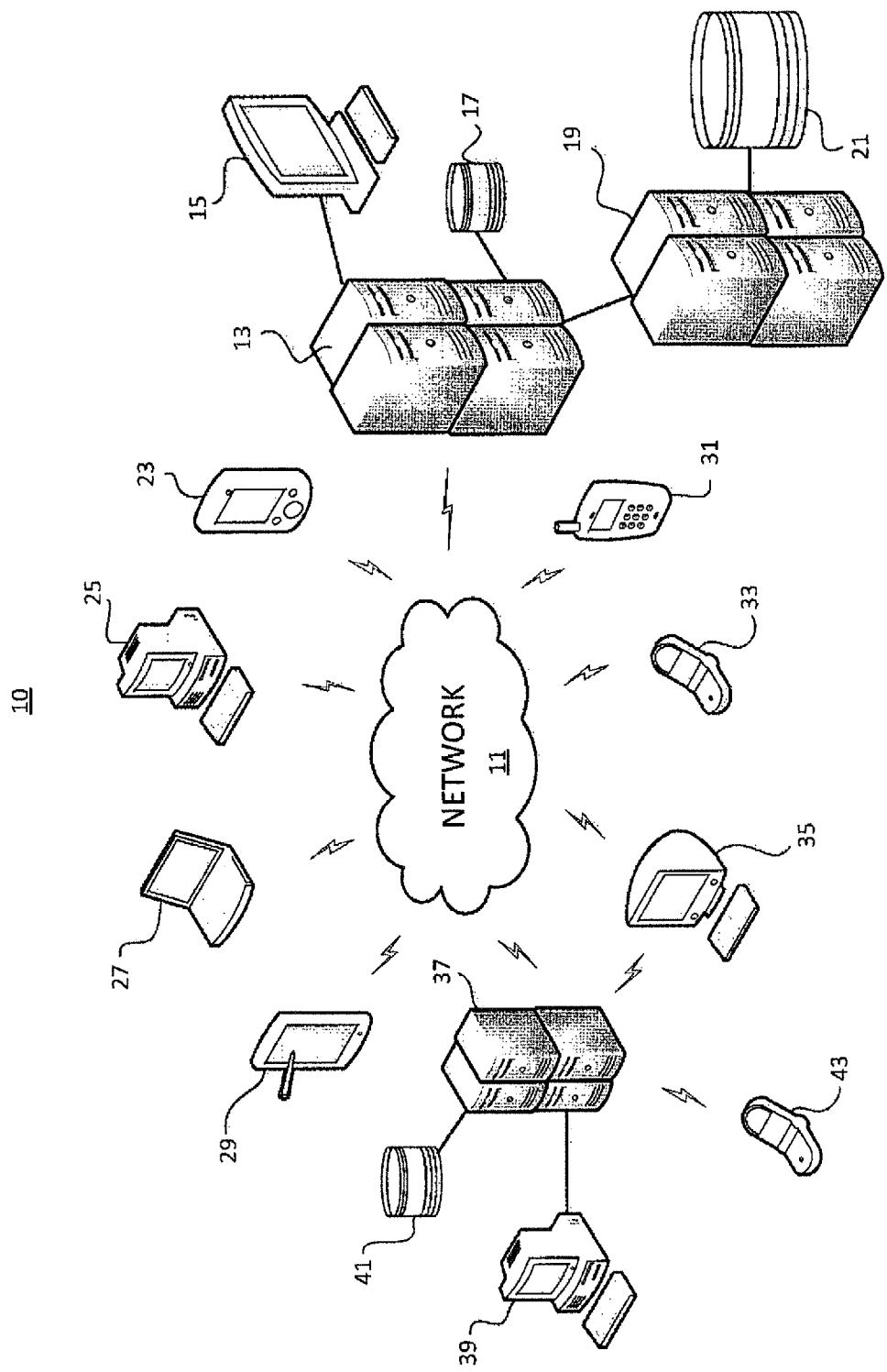
FIG. 1 is a pictorial block diagram of a modern communications network in which the present invention may be implemented.

Within the scope of the invention, computing devices that may be uniquely identified with a device fingerprint include any device capable of receiving resources remotely through a network connection. FIG. 1 illustrates many such devices connected in a modem network communications system 10. System 10 represents but one example of a network within which the present invention may be practiced.

System 10 at its center depicts a network cloud 11, which represents a combination of wired and wireless communication links between devices that make up the rest of the system. The communication links of network 11 may run from any device to any other device in the network, and may include any means or medium by which analog or digital signals may be transmitted and received, such as radio waves at a selected carrier frequency modulated by a signal having information content. Network 11 may include telecommunication means such as cellular communication schemes, telephone lines, and broadband cable. The communication means of network 11 may also include any conventional digital communications protocol, or any conventional analog communications method, for transmitting information content between computing devices. In one embodiment, or for ease of illustration, network 11 may be considered to be synonymous with the Internet.

Incremental device fingerprinting for any device connected to network 11 may be performed by running an executable device-identification code, also known as incremental fingerprinting (IFP) code, on the connected device. The IFP code may be stored on any device or number of devices; however, for purposes of illustration, throughout the remainder of this disclosure embodiments of the invention are described in which the IFP code is stored primarily on an application server 13. When authorized or requested by a user of any other device connected to network 11, the IFP code may be transferred from application server to the requesting device for execution thereon and for temporary or secondary storage therein. For example, the IFP code may be run in a web browser of the device being fingerprinted.

Application server 13 may be a special-purpose computer system that includes a set of hardware and software components dedicated to the execution and distribution of the IFP code. Application server 13 may be configured for network communications, i.e., for transmitting and receiving resource requests to and from other devices linked to network 11, and may include a web server to facilitate network communications. Application server 13 may also be configured to perform other functions conventionally associated with application servers, such as security, redundancy, failover, and load-balancing. A user interface 15 provides user or administrator access to data processed by the application server, or to the software components that make up the application server. Memory 17 stores operating system, web server, IFP code, and other data or executable software stored on application server 13.

A database server 19 may be linked for data communication with application server 13. Database server 19 may be a special purpose computer system that includes hardware and software components dedicated to providing database services to application server 13. Database server 19 interfaces with memory 21, which may be a large-capacity storage system. In one implementation of incremental device fingerprinting according to the invention, memory 21 may be a main repository or historical archive for storing a comprehensive collection of device fingerprints for millions of devices communicating, or having once communicated, through network 11.

Any computing device capable of receiving digital information via network 11 may be subject to incremental device fingerprinting according to the invention. System 10 provides a representative group of such devices for purposes of illustrating exemplary embodiments of the invention, but the invention is by no means limited to the number and type of devices shown in FIG. 1. Examples of devices known today for which a device fingerprint may be defined by the invention include, but are not limited to, a PDA 23, a PC 25, a laptop 27, an iPad 29, a smart phone 31, a cell phone 33, and an Apple computer 35, as shown, all or any of which may be configured for direct or indirect communication via network 11. Any device in the preceding list of devices may be referred to hereinafter as a "computing device", a "client device", a "requesting device", or a "receiving device".

A server 37 may also constitute a computing device subject to incremental device fingerprinting. Moreover, each device among a group of devices configured to communicate locally with server 37, and to access network 11 via server 37, may potentially be fingerprinted according to the invention. These include, for example, the Apple computer 35, a PC 39, and a cell phone 43, as shown. Server 37 may be any type of server, such as an application server, a web server, or a database server, and may access a memory 41. In one embodiment, server 37 provides a web page accessible through network 11 by other devices. The web page may provide information such as text, graphics, data structures, audio, video and computer applications that are stored as digital data in memory 41 for downloading or streaming via network 11.

Figure 2:
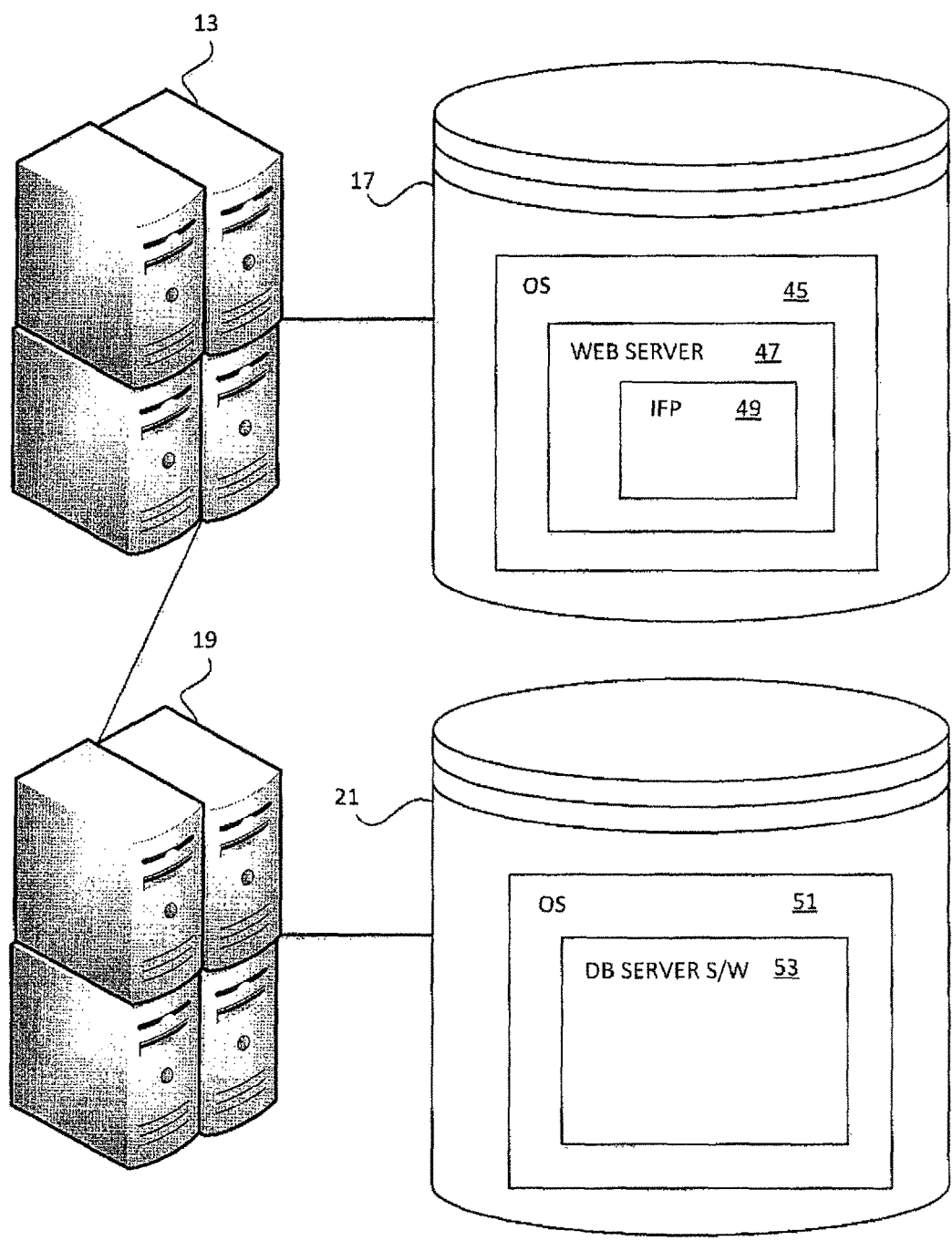
FIG. 2 is a block diagram of one embodiment of server systems used to implement the present invention.

FIG. 2 illustrates a block diagram of a system according to one embodiment of the invention for implementing incremental device fingerprinting. As indicated in the figure, the platform of application server 13 may include a set of software programs stored in the memory 17. These programs include an operating system (OS) 45, which manages basic hardware functions of server 13, such as input and output and memory allocation. OS 45 may further provide services for execution of application software, such as the web server 47 and the IFP 49. OS 45 may be any operating system, such as a Windows, Unix, Mac OS, Linux, or Google Chrome operating system.

Web server 47 may comprise software necessary for serving content using an appropriate protocol, such as hypertext transfer protocol (HTTP), over network 11. The content served may include a web page to facilitate communication with other devices via the network. In any event, web server 47 is configured to respond to resource requests received from client devices, and to issue resource requests to client devices. For example, web server 47 may include routines for requesting resources from other devices or servers connected to network 11. A resource request may be fulfilled by web server 47, for example, by uploading IFP 49 to a requesting server, or to a client on behalf of a requesting server, for incremental device fingerprinting on the client device according to the invention. Web server programs having user agent applications implementing network protocols for connecting to uniform resource locator (URL) paths are well known in the computing arts, and any such program, supplemented as necessary for implementation of IFP 49 of the present invention, may be appropriate for the coding of web server 47.

Software program IFP 49 includes all code, data, text files, and executable algorithms for deriving a partial device fingerprint or a full device fingerprint from a computing device. IFP 49 may be organized as a source tree, and may be composed in any source code language compatible with modern computing systems, such as Java or C, and may implement encoding rules such as XML. IFP 49 may further include data, executable files, plug-ins, or other content that may comprise resources or requests served by web server 47 via network 11 under control of OS 45. An incremental device fingerprinting algorithm stored in IFP 49 may derive a device fingerprint for any remote computing device communicating via network 11, such as any one of devices 23, 25, 27, 29, 31, 33, 35, 37, 39, and 43. Examples of IFP algorithms dedicated to deriving device fingerprints from data associated with a particular remote computing device are modeled and described herein as process flow diagrams 400, 500, 600, 700, 800 and 900.

The platform of database server 19 may be stored in memory 21. Memory 21 may store an operating system (OS) program 51, as well as database (DB) server software 53. The OS 51 may be any operating system satisfactory for this purpose, such as any of those listed above for application server 13. DB server software 53 contains the programs necessary for providing database services to application server 13. The memory 21 may also provide large-scale data storage for a master archive of device fingerprints. Memory 21 may also provide backup storage, such as in a master-slave architecture for database servers. The application server 13 and database server 19, interacting with remote devices via network 11 within a system such as system 10, provides an exemplary computing environment for incremental device fingerprinting according to the invention.

Figure 3:
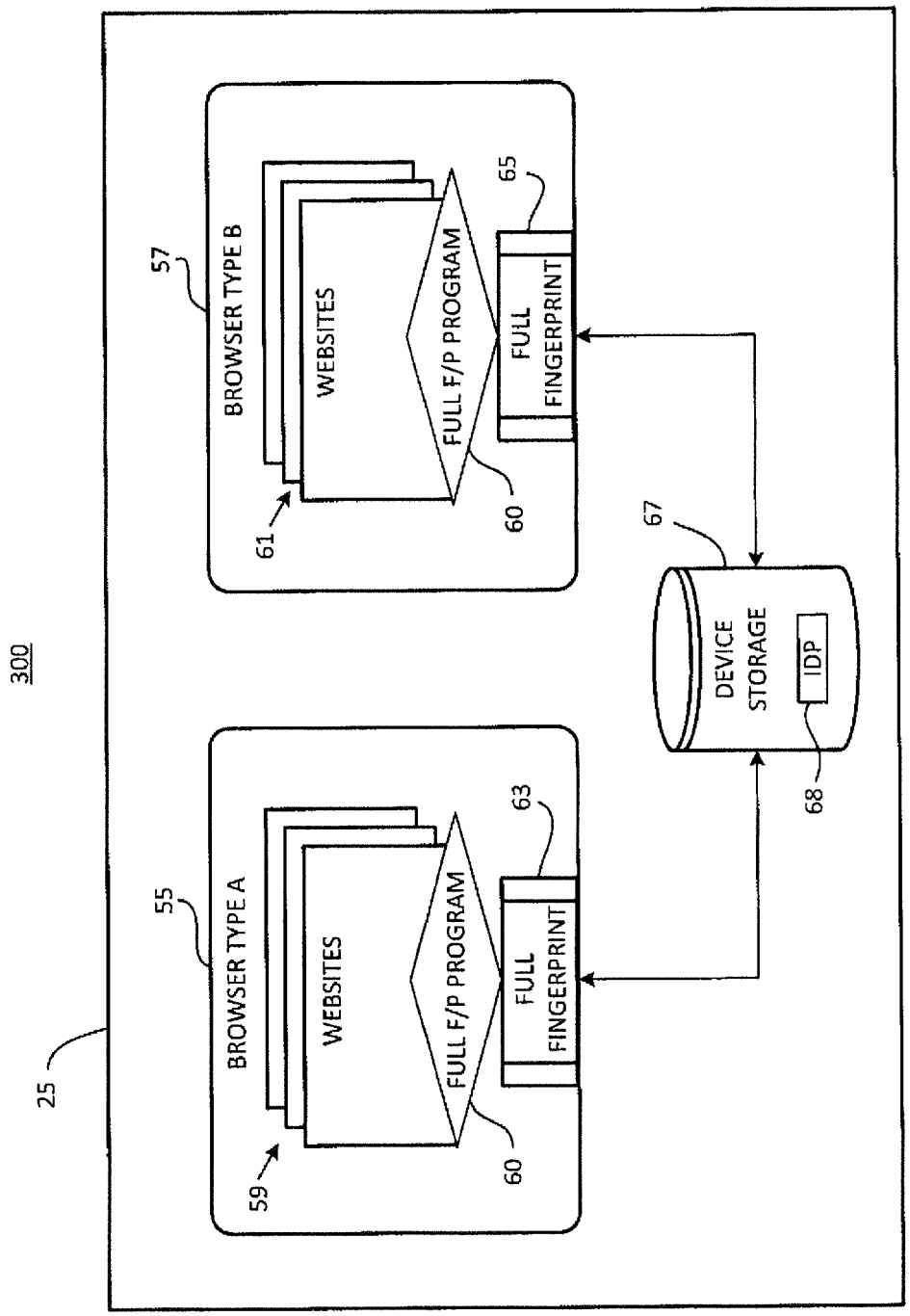
FIG. 3 is a block diagram of software components within a computing system for running a browser-based full fingerprinting program within either of two different web browsers according to one embodiment of the invention.

To better understand the utility of incremental fingerprinting, an explanation of full fingerprinting is first provided. FIG. 3 is a block diagram 300 of software components within a computing device 25 implementing a browser-based full fingerprinting program. Full fingerprinting is the eventual goal when fingerprinting a computing device. A full fingerprint is obtained when the fingerprinting program has collected all metrics from a target device that it is designed to collect, and from those metrics generates a complete fingerprint for the device that uniquely identifies the device among millions of other computing devices, e.g. the total population of devices connectable to network 11. In this sense, a fingerprinting program according to the invention is one that uniquely identifies a device so that the probability of the program generating an identical fingerprint for another device is less than a desired acceptance value. In one embodiment, the desired acceptance value is $1 \times 10^9$ (one in one billion). Other acceptance values are possible within the scope of the invention.

Computing device 25 includes many features not shown in the figure that would be readily understood by an experienced computer software engineer as inherent properties of the computer. These include conventional hardware components, e.g. core processor, memory, power supply, interface cards, and communication ports, and software components, e.g. BIOS, operating system, graphical user interface, and other applications that manage hardware functions, perform memory allocations, read and write operations, etc. The operating system of PC 25 may be any of the same proposed for OS 45. The operating system may further provide services for execution of application software, such as web browsers and the fingerprinting programs disclosed herein.

A browser-based fingerprinting program according to the invention may be run effectively on a computing device 25 equipped with any number of browsers. For ease of illustration, the invention is described hereafter within the context of a computer running two different browsers, each preferably running at different times. The principles of the invention may be scaled for computing devices running more than two browsers, and may be applied to devices running multiple browsers simultaneously. In diagram 300, PC 25 includes two different web browsers. Web browser 55 is arbitrarily denoted as type A, and web browser 57 is denoted as type B to distinguish it from type A. For example, browsers 55 and 57 may be versions of Microsoft Internet Explorer and Mozilla Firefox, respectively.

With reference to diagram 300, a user of device 25 with an active connection to network 11 may, through one of the browsers 55 or 57, request one resources from one or more remote servers and cause websites 59 to return resources to the device. When the user request" a triggering resource using browser 55 or 57, a full fingerprinting program 60 will load. Program 60 runs in the background and begins to collect metrics that are detectable within the open browser. When a requisite number of metrics are collected, a full fingerprint 63 or 65 (depending on which browser is open) is generated by some combination of sampling, hashing, encoding, and combining binary data that composes or represents each of the metrics. The full fingerprint may then be transmitted back to the server from which device 25 requested the triggering resource, or transmitted for storage on a third party server functioning as a fingerprint archive (e.g. server 19).

On device 25, program 60 then creates a permanent device identifier (IDP) 68, which is a data string that references the full fingerprint. Program 60 may then store the permanent device identifier 68 in device-based storage (DBS) 67, i.e. memory local to the device. One example of device-based storage would be memory on a hard drive reserved for use by the web browser. To store the fingerprint in device-based storage 67, program 60 must first gain access to the storage location. In one implementation, access to device-based storage 67 may be effected by program 60 loading on the requesting device a program such as Flash or Silverlight that runs outside the browser. In one embodiment, one IDP 68 may be stored as a Flash cookie, i.e. storage at the device level accessible to a browser capable of running Flash.

There are, however, a number of uncertainties that may arise using the browser-based full fingerprinting method. For one, the time required for FP program 60 to collect metrics for a full fingerprint can easily exceed the time available for such collection. The brevity of the collection window may result from the user navigating away from the web site or closing the browser, or it may result from a strict specification imposed by the web page host. For example, in markets such as ad delivery, where rendering speed carries a high priority, a host may restrict total loading or execution time of a fingerprinting program to 40 milliseconds or less. Having to load flash or otherwise gain access to device-based storage can slow the process even further. As a result, there may be insufficient time for generating the full fingerprint 63 or 65.

Another uncertainty can occur when a user accesses the server in a subsequent browsing session using a different browser than the browser that was used to collect a full fingerprint 63 in an earlier session. In this scenario, a full fingerprint 65 generated by FP program 60 running in the second browser 57 may appear to identify an entirely different computing device than the device identified by full fingerprint 63 in browser 55, even though fingerprints 63 and 65 both identify the same computing device 25. The extent of the differences between the two fingerprints will depend on how differently the browsers are configured, in terms of the metrics collected by FP program 60. Certain metrics that are collectable via a browser, such as an IP address, may not change as a result of loading one browser or another. Others metrics may vary, depending on the browser type and configuration.

In various embodiments, the list of device configuration metrics collectable or retrievable by an IFP running a device identification code according to the invention may be selected from the following table:

TABLE 1

| TYPE | METRIC |
| --- | --- |
|  | LIST OF CONFIGURATION METRICS |
| PDF | (a) contains a property "SupportsAcrobat" which will contain the description string from the navigator plug-ins object or objects which contain the words "adobe acrobat" or "adobe reader". |

TABLE 1-continued

LIST OF CONFIGURATION METRICS

| TYPE | METRIC |
|---|---|
| AJAX | (a) contains string "XMLHttpRequest object" if the browser is able to instantiate XMLHTTPRequest object.<br>(b) contains string "ActiveX object (Msxm12)" if instantiation of XMLHTTPRequest object fails and Msxml2.XMLHTTP can be instantiated.<br>(c) contains string "ActiveX object (Microsoft)" if instantiation of previous 2 components fails.<br>(d) contains empty string if all (a), (b) and (c) fail. |
| CPU | (a) "unknown" if cannot be determined.<br>(b) contains navigator.cpuClass if available.<br>(c) contains "wow64-"navigator.cpuClass if WOW is detected. |
| TIMEZONE | (a) contains property "Offset" which indicates timezone offset from GMT in minutes. |
| FONTS | (a) contains list of fonts returned from flash control if Flash is available.<br>(b) if Flash is not available, contains a list of fonts as detected by javascript (these fonts are detected by checking the machine's fonts against a list in the javascript and in general will detect a subset of the fonts actually installed). |
| GEARS | (a) contains empty string if gears is not installed, otherwise contains result of google.gears.factory.getBuildInfo( ); an example of which is the string "0.5.36.0; official; opt; win32; ie". |
| LANGUAGES | (a) contains property Language which is result of navigator.language, property "System Language" which is result of navigator.systemLanguage, property "User Language" which is result of navigator.userLanguage and "Browser Language" property which is result of navigator.browserLanguage. |
| PLUGINS | (a) contains a set of CLSID/version properties; CLSIDS comes from a fixed list of CLSIDs on IE and from the list of plugins returned by navigator.plugins on other platforms (on platforms other than IE, there will be name/description/filename property sets for each plugin) |
| GENERAL | (a) contains properties based on each of the following values: navigator.appName + navigator.appCodeName (note these first 2 are not separated by a space) navigator.appVersion + navigator.appMinorVersion; navigator.vendor; navigator.userAgent; navigator.oscpu; navigator.platform; navigator.securityPolicy; navigator.onLine; |
| SILVERLIGHT COMPONENTS | collected through attempts to instantiate the Silverlight ActiveX control and loop through a fixed list of versions and via the IsSupportedVersion( ) method on the Silverlight control determine which versions are available:<br>(a) if versions are available, property "Version" will be added for each Silverlight version discovered.<br>(b) If an error occurs, a version property will be added with the value "Error". |
| READER COMPONENTS | contains the PDF reader components available on the machine. |
| DOTNET | retrieves Microsoft .Net versions detected by examining the user agent string. |
| GUID | contains a service provider-assigned GUID contained device storage such as a Flash cookie. |
| DISPLAY | contains two properties - width and height which indicate the display resolution in pixels. |
| IP ADDRESS | (a) contains the IP address of the device which requested the page (this could be a proxy, it could be a NAT, or it could be the user's machine).<br>(b) on the server side, the IP address is geolocated. If available, the country, zip code and/or telephone area code associated with the IP address are used in place of the actual IP address. |

It should be understood that the foregoing list may expand or change along with advances in the art that make available for collection through a browser additional configuration metrics that are not in use today or may be otherwise unknown to the inventor at this time.

Figure 4:
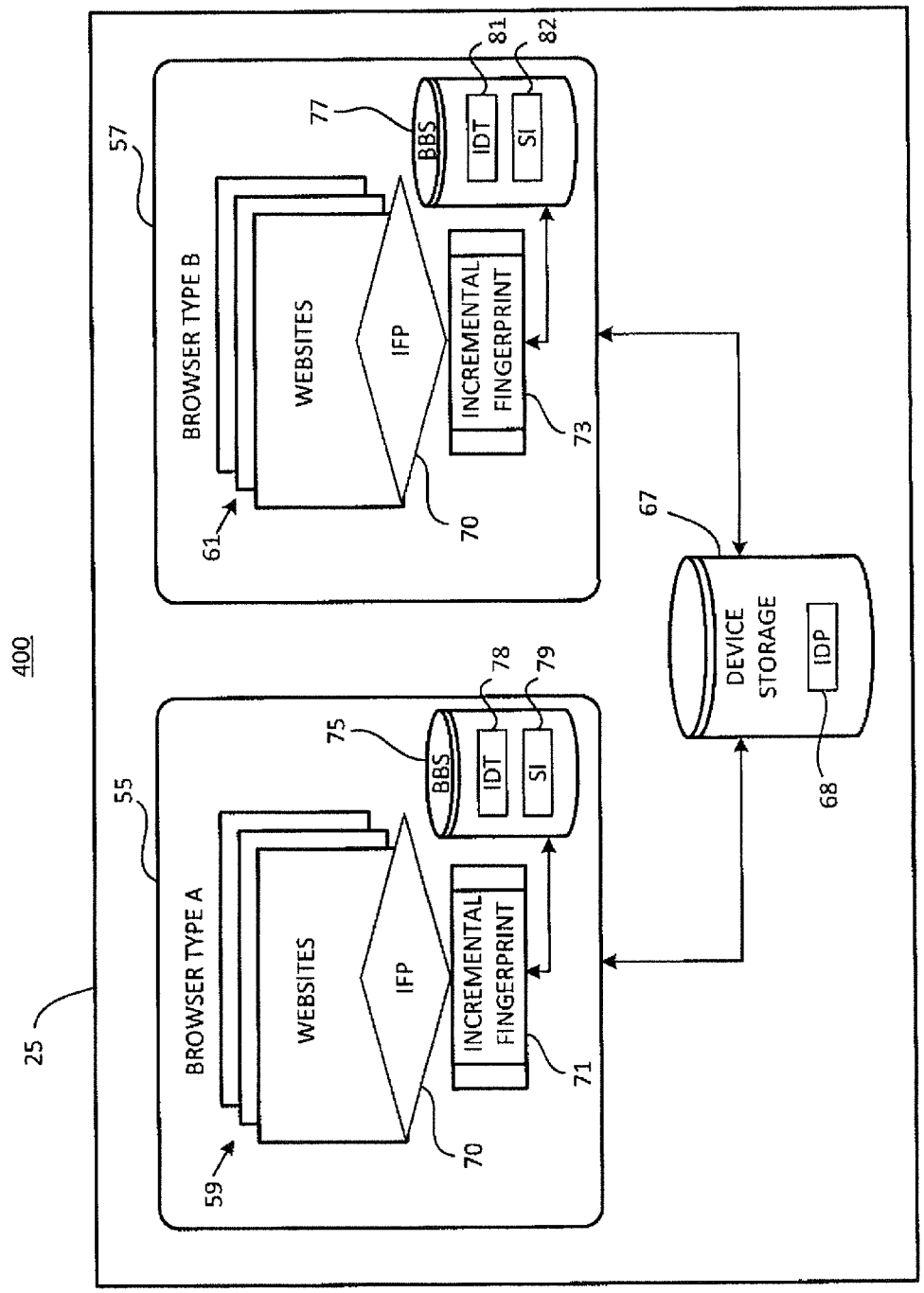
FIG. 4 is a block diagram of software components according to the invention within a computing system for running a browser-based incremental fingerprinting program within either of two different web browsers according to one embodiment of the invention.

FIG. 4 illustrates a block diagram 400 of a browser-based incremental fingerprinting scheme in accordance with the present invention. Incremental fingerprinting may be executed by an incremental fingerprinting (IFP) program 70 running within a browser a computing device 25. As in the previous example, only two browsers (55 and 57), each of a different browser type, are illustrated in diagram 400. The invention may be scaled to accommodate any number of different browser types residing on a common computing device.

Incremental browser-based fingerprinting is designed to avoid excessive rendering times associated with loading Flash or any other technology that resides outside the browser. Rather than relying entirely on device-based storage, the invention exploits the capabilities of browser-based storage (BBS). Browser-based storage refers to memory that is specifically provided by, or integrated within the browser processing module, as opposed to memory external to the browser that needs to be separately loaded each time it is accessed. One example of browser-based storage is DOM-based storage. DOM-based storage is known in the art, and has been employed in different browser software. For example, Microsoft Internet Explorer employed DOM-based storage in version 5.5. Other examples of browser-based storage, such as HTML-5, may be employed in accordance with the present invention.

To enable a more responsive execution time, an incremental fingerprinting process according to the invention collects fingerprinting metrics in stages or increments. Generally, the order in which the metrics are collected is determined by a comparative scale having two criteria: (i) indication of uniqueness and (ii) speed of collection. In the earliest stages, metrics targeted for collection are those metrics that are most indicative of the uniqueness of a computing device and that can be collected the most quickly. In later stages, additional metrics are targeted that are either less indicative of uniqueness or less able to be collected quickly. In the final stages, the targeted metrics are those that are less indicative of uniqueness and less able to be collected quickly. By collecting metrics this order, the highest quality partial fingerprint may be collected in the initial stage. In subsequent stages, additional metrics are collected to supplement the fingerprint, until eventually all targeted metrics are collected for generation of a full fingerprint. By collecting metrics in stages, the execution time of each stage may be controlled to conform to host specifications and avoid excessive loading delays.

Implementation of incremental browser-based fingerprinting is made possible through IFP 70 accessing browser-based storage 75. IFP 70 comprises the executable device identification code that is programmed to retrieve a complete set of device configuration metrics from within the web browser in which it runs. When IFP 70 runs in its initial stage, it quickly collects a first subset of the complete set of metrics. At some point, the execution of the device-identification code of IFP 70 is interrupted, for example, as result of a user closing browser 55, as a result of expiration of an allotted execution time, or as a result of successful collection of all metrics that compose the first subset. IFP 70 will then generate incremental fingerprint 71, which is a partial device fingerprint based on the device configuration metrics that were collected as the first subset. The metrics that compose the first subset (or other subsets) may be determined according to various criteria. In one example, a subset may consist of the number of device configuration metrics that have been retrieved when the web browser exits the web page. In another example, a subset may consist of the minimum number of device configuration metrics needed to satisfy a predetermined fingerprinting criteria such as identification accuracy. In another example, a subset may consist of the number of configuration metrics retrieved upon expiration of an allotted execution time.

In one embodiment, incremental fingerprint 71 comprises discrete data strings, each data string representing a collected metric. In another embodiment, an incremental fingerprint may comprise a concatenation or combination of two or more such data strings. In another embodiment, the incremental fingerprint may comprise a data file, such as a text or XML file encoded in computer-readable form and including each collected metric. IFP 70 may include a hashing algorithm that transforms the data that makes up the incremental fingerprint. In another implementation, IFP 70 may cause incremental fingerprint 71 to be transmitted, for example, as an encrypted token, to a remote server for storage in a fingerprint database. This ensures that the fingerprint can be recorded in a persistent archive.

After the incremental fingerprint is generated, IFP 70 then generates a temporary device identifier (MT) 78. In one embodiment, temporary device identifier 78 comprises a data string that references the incremental fingerprint. IFP 70 also generates a subset indicator (SI) 79, which may be another data string that identifies the device configuration metrics that compose the first subset. For example, each metric in the complete set may be numerically coded in order of importance or according to metric type. Subset indicator 79 may comprise a concatenated string of the numerical codes that collectively represent the metrics in the subset. When these data are generated, IFP 70 may then store the temporary device identifier 78 and the subset indicator 79 in browser-based storage 75. IFP 70 may also transmit the subset indicator 79 to the remote server for storage in the fingerprint database and association with incremental fingerprint 71. In one embodiment, writing the temporary device identifier and the subset indicator to browser-based storage completes the first partial fingerprinting stage.

At a later time, execution of the device identification code of IFP 70 will resume. It may resume immediately after completion of the first partial fingerprinting stage, or it may resume after a programmed delay. In another scenario, the execution resumes when the browser revisits the triggering web page, which is described in further detail below. In any case, when IFP 70 resumes, it queries the browser-based storage to detect the presence of a temporary device identifier 78. If in response to the query, the temporary device identifier is detected or returned, IFP 70 then retrieves the partial device fingerprint associated with the temporary device identifier and commences collecting a second set of device configuration metrics. In one embodiment, the second set of metrics includes metrics of the next-highest level of importance on the comparative scale, and includes only metrics that are not included in the first subset. By reading subset indicator 79, IFP 70 can detect which metrics have already been collected and exclude any of the collected metrics from the second subset. When the next interruption occurs in the execution of the device identification code, either through termination of browser 55 or through IFP 70 satisfying a process criterion, IFP 70 may update the partial device fingerprint 71 using the newly collected metrics. Updated values for the temporary device identifier 78 and subset indicator 79 are then generated and recorded in browser-based storage 75.

The process of incremental fingerprinting may continue in this manner, by collecting subsets of metrics in chronological stages and updated the incremental fingerprint, until the subset indicator 79 is queried and returns indication that a complete set of device configuration metrics has been collected. At this point, IFP 70 may promote the temporary device identifier 78 to a permanent device identifier (IDP) 68. In one embodiment, promotion of the device identifier includes marking or modifying the subset indicator 79 to indicate that a full fingerprint has been taken, and writing the temporary device identifier 78 to device-based storage 67. When written to device-based storage, the temporary device identifier 78 represents a permanent device identifier. In one embodiment, the permanent device identifier 68 may be stored as a single Flash cookie, i.e. data recorded at the device level accessible to a browser capable of running Flash.

With the subset indicator 79 marked as permanent in browser-based storage 75, the computing device need not be fingerprinted a second time in response to a resource request in a subsequent browsing session. Instead, during a subsequent session, IFP 70 may first query browser-based storage for the indicator 79. If the indicator is found. IFP 70 may transmit a device identifier 68 or 78 back to the server to identify the device to the server as a recognized device. The server may confirm the identity by matching the device identifier to a fingerprint stored in an accessible archive.

In diagram 400, the second browser 57 is shown also residing on device 25. The process of incremental browser-based fingerprinting as implemented within browser 55 may also be implemented within browser 57. When a user loads a second browser 57 and visits a website configured with a scheme for triggering IFP 70, the process of incremental fingerprinting will commence just as if browser 57 were running on an unknown computing device. IFP 70 will generate and update an incremental fingerprint 73 in stages, and at the conclusion of each stage write a temporary device identifier 81 and subset indicator 82 to browser-based storage 77 within browser 57. Promotion of the partial fingerprint to a permanent fingerprint occurs when subset indicator 82 indicates that a complete set of configuration metrics has been collected, and temporary device identifier 81 is written to DBS 67 as the permanent device indicator 68. Incremental fingerprints 73 and subset indicators 82 may be stored or updated in a remote database between stages.

Incremental fingerprinting may commence within browser 57 whether or not there has been any prior fingerprinting activity performed for device 25. In one scenario, a partial fingerprint has been previously generated for device 25 within browser 55 when the user opens the second browser 57. In another scenario, a full fingerprint has already been generated for device 25 through the first browser 55, and a permanent device identifier stored in DBS 67, when the user opens the second browser 57. In either scenario, incremental fingerprinting may commence within browser 57. To avoid generating two full fingerprints for the same device, however, a method according to the invention initiates asynchronous fingerprint completion, which is described below in further detail.

Figure 5:
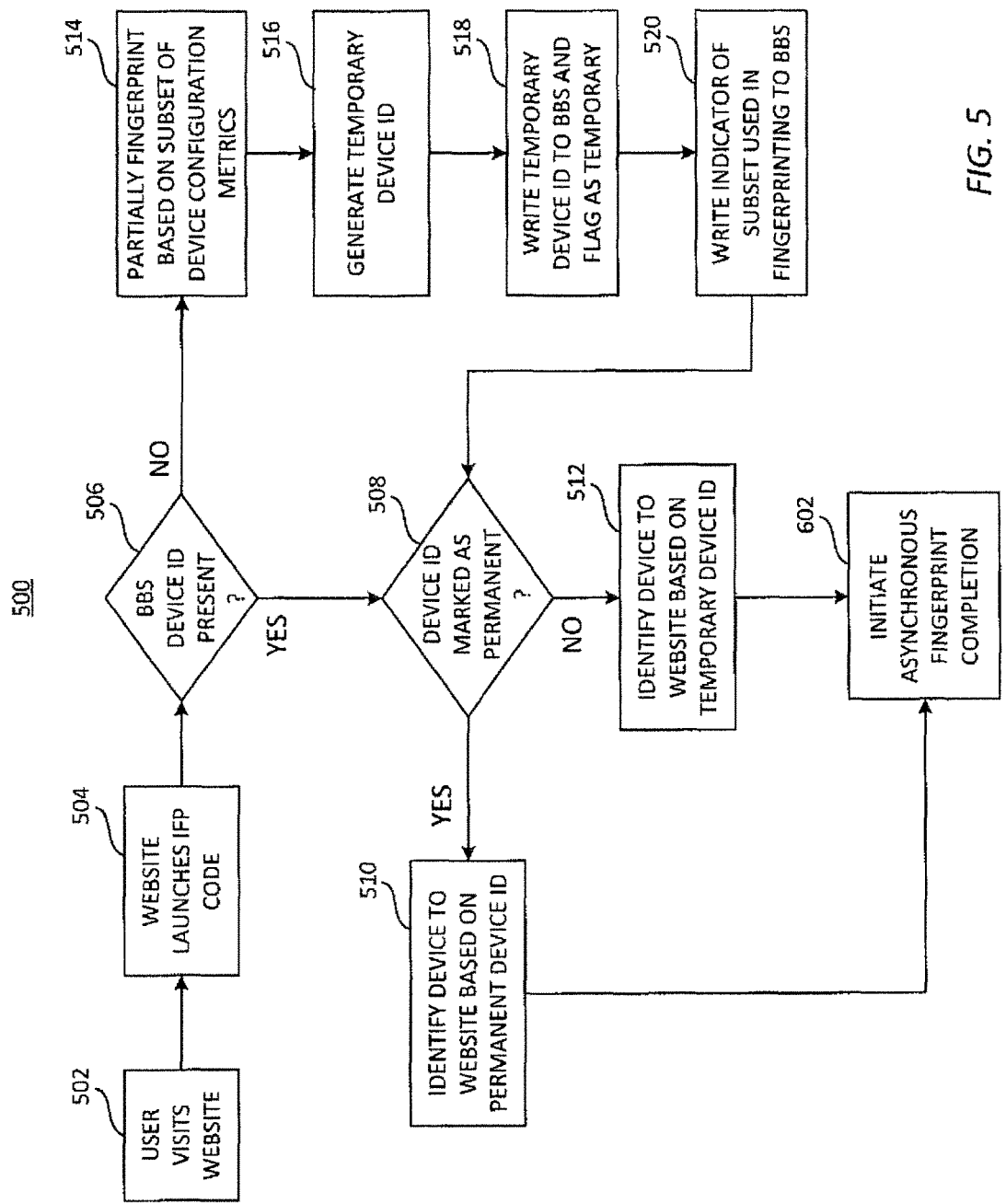
FIG. 5 is a process flow chart illustrating one embodiment of a method according to the invention for incrementally fingerprinting a computing device.

FIG. 5 presents a flow chart 500 illustrating process steps in a method according to the invention for incremental browser-based device fingerprinting. Flow chart 500 may be combined with charts 600 and 700 to capture the overall process. The process begins at block 502, which represents a user of a computing device such as device 25 visiting a web site. By visiting the web site, the user is requesting one or more resources from the site. The site visited is equipped with an incremental fingerprinting code IFP. In the next block 504, the site launches the IFP code, which enables a device identification algorithm to run within the browser of the user's computing device. The process and decision blocks that follow represent additional features of the IFP code. The next step 506 is a decision block that determines whether a device identifier is already present in browser-based storage. This may be ascertained in any number of ways, for example, by searching browser-based storage for data residing in a memory location reserved for the device identifier, or for searching for a data string having specialized indicia that identifies it as a device identifier.

If block 506 finds a device identifier, the process moves to block 508. Block 508 is another decision block. It determines whether the device identifier has been marked as permanent. If the device identifier is permanent, the process moves to block 510, otherwise, the process moves to block 512. A device identifier may be determined to be temporary or permanent, for example, by reading the status indicator 79 or 82. At block 510, a permanent device identifier has been detected in browser-based storage. Here, the IFP identifies the computing device to the website (or to a remote server) as a recognized device based on the permanent device identifier. The website may then use this information for some other purpose, such as granting (or denying) access to secure data, approving (or disapproving) an on-line transaction, fulfilling (or denying) a resource request, etc. The permanence of device identifier means that the user's computing device had been previously fully fingerprinted, and the device identifier recorded in a device-based storage technology such as a Flash cookie for future sharing between different browsers. That is, the permanent device identifier may have been stored using any of the browsers resident on the device, and not necessarily by the browser presently open. In another scenario, the permanent device identifier may have been generated as a result of an IFP program being launched by a web site other than the site visited by the user in block 502. From block 510 the process moves to block 602 to initiate asynchronous fingerprint completion.

If block 508 determines that the device identifier is temporary, i.e. not marked as permanent, then the process advances to step 512. In this step, the computing device is identified to the website based on the temporary device identifier. The website may use this information for another purpose, such as identifying the device as accurately as possible by cross-referencing the temporary device identifier to its associated partial device fingerprint. The accuracy of such identification will depend on how many metrics or subsets of metrics were collected to generate the associated partial fingerprint. In some cases, the partial fingerprint will be sufficient to uniquely identify a device. In other cases, the partial fingerprint may narrow the field of possible matches to only a few devices. From block 512 the process moves to block 602 to initiate asynchronous fingerprint completion.

Referring back to decision block 506, if no device identifier is found, the process advances to block 514. The absence of a device identifier generally indicates that the browser presently open is visiting the web site for the very first time. The functions represented in blocks 514, 516, 518, and 520 reflect steps in the incremental fingerprinting process described with reference to diagram 400. In block 514, the device identification code of the incremental fingerprinting program commences partially fingerprinting the device based on a first subset of device configuration metrics. In block 516, a temporary device identifier is generated based on the subset or subsets of all metrics previously collected. In block 518, the temporary device identifier is updated or written to browser-based storage and flagged or marked as temporary. In block 520, a subset indicator may be updated or written to browser-based storage to identify all metrics used to generate the most current partial fingerprint. From here, the process loops back to step 508, and eventually advances to block 602.

Figure 6:
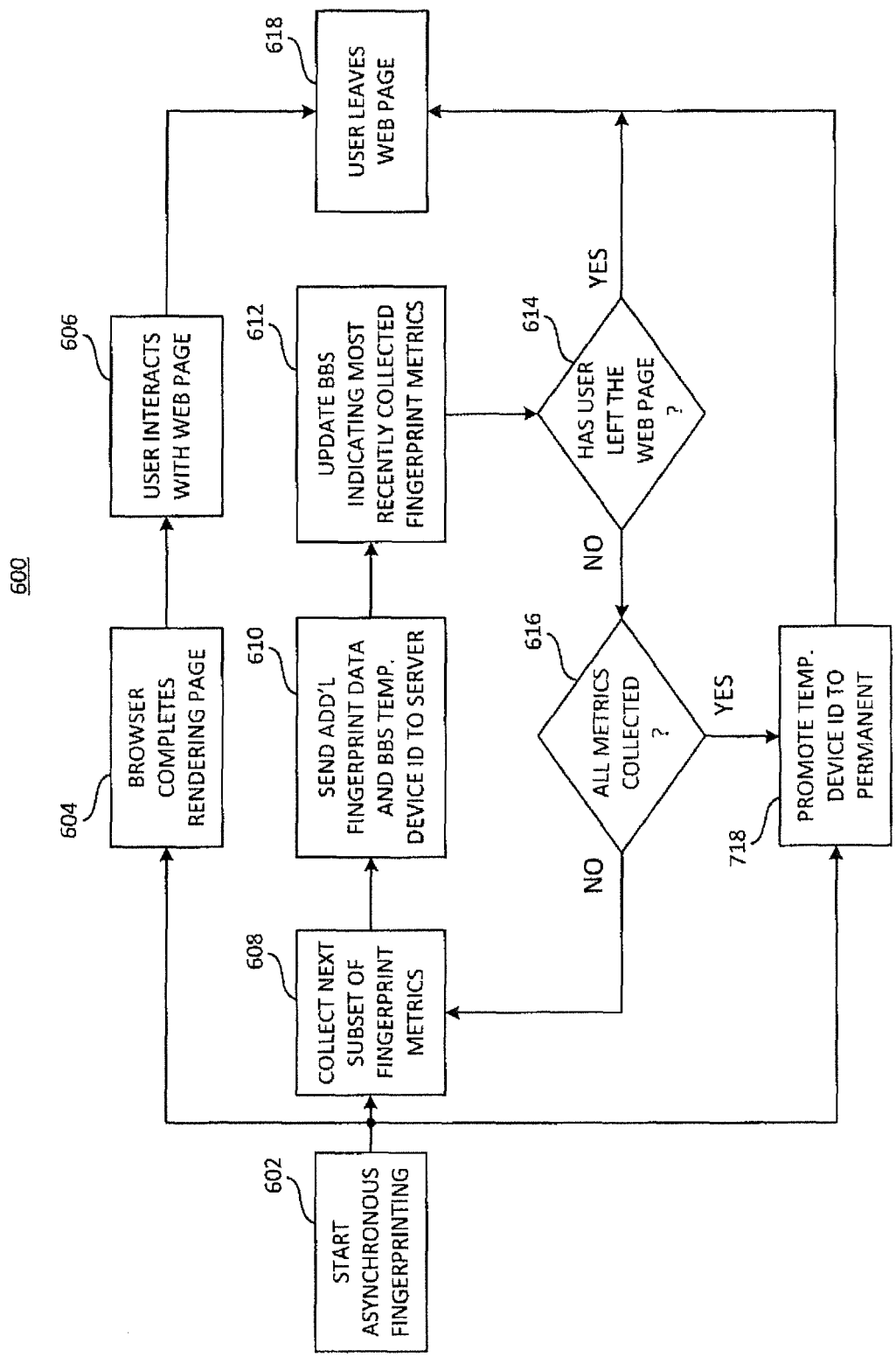
FIG. 6 is a process flow chart illustrating parallel processes being executed in a web page running an incremental fingerprinting program according to one embodiment of the invention.

FIG. 6 presents a flow chart 600 that illustrates additional process steps for incremental browser-based device fingerprinting. The steps in chart 600 provide greater detail for the asynchronous fingerprint completion process. Asynchronous fingerprint completion refers to the fact that incremental fingerprinting may be performed in a series of non-consecutive or non-contiguous stages, and may involve concurrent or overlapping attempts to fully fingerprint a device using more than one browser. An incremental fingerprinting attempt made within one browser may be interrupted at any stage, leaving the process dormant until re-initiated. While dormant, a user of the same computing device may open a different browser and initiate another incremental fingerprinting attempt, which may also be interrupted before fully fingerprinting the device and writing a device identifier into device-based storage. Chart 600 captures multiple parallel processing paths that may occur during the overall fingerprinting process.

The asynchronous fingerprinting process begins at step 602 and may commence while browser activity proceeds along any of three paths concurrently. Along the top-most path, in step 604 the browser begins rendering a requested web page and continues rendering, i.e. downloading and displaying text, graphics, data, audio, or video files, loading Flash or other plug-ins, etc., until the browser completes the rendering. The next step 606 represents the user interacting with web page, for example, visually reading the rendered page, entering data, making selections, etc. This interaction continues until the user leaves the web page at block 618. When the user leaves the web page, an incremental fingerprinting process may be interrupted.

From block 602, a concurrent process for incremental fingerprinting is presented in the central paths. Blocks 608, 610, and 612 represent subsequent stages for incremental fingerprinting after an initial stage has been completed (as in blocks 514, 516, 518, 520). The incremental fingerprinting activity runs in the background while browser rendering and user interaction processes occur. At block 608, a next subset of device configuration metrics are collected for the device being fingerprinted. The next subset may be predefined according to a preferred order of importance. The temporary device identifier is updated based on the additional metrics collected. The subset indicator is updated to identify all metrics collected. Next, in step 610, the newly collected metrics are sent to the web site or to a remote server along with the updated temporary device identifier, and optionally, along with the updated subset indicator. In step 612, the updated subset indicator and updated temporary device identifier are saved to browser-based storage.

The central path process then advances to decision block 614, at which point the process determines whether the user has exited the web page. If so, the process ends at block 618. If not, decision block 616 is executed to determine whether all metrics that compose a complete set of metrics needed to fully fingerprint the device have been collected. This may be ascertained by reading the updated subset indicator recorded in browser-based storage. If there are any metrics not yet collected, the process loops back to block 608 for collection of the next subset.

If at block 616 it is determined that all device configuration metrics have been collected, the process advances to block 718. In block 718, the temporary device identifier is promoted to a permanent device identifier. The process of promoting a temporary device identifier to permanent may also run in the background during browser rendering and user interaction. Generally, this is accomplished by accessing device-based storage, e.g. loading Flash, then writing the most recently updated temporary device identifier to device based storage, e.g. as a Flash cookie. In one implementation, where a user stays on the triggering web page long enough for all metrics to be collected without interruption, and long enough for the IFP to access device-based storage, a generated device identifier may be promoted to permanent in a single pass. A more detailed explanation of a promotion process for a device identifier is presented in chart 700.

Figure 7:
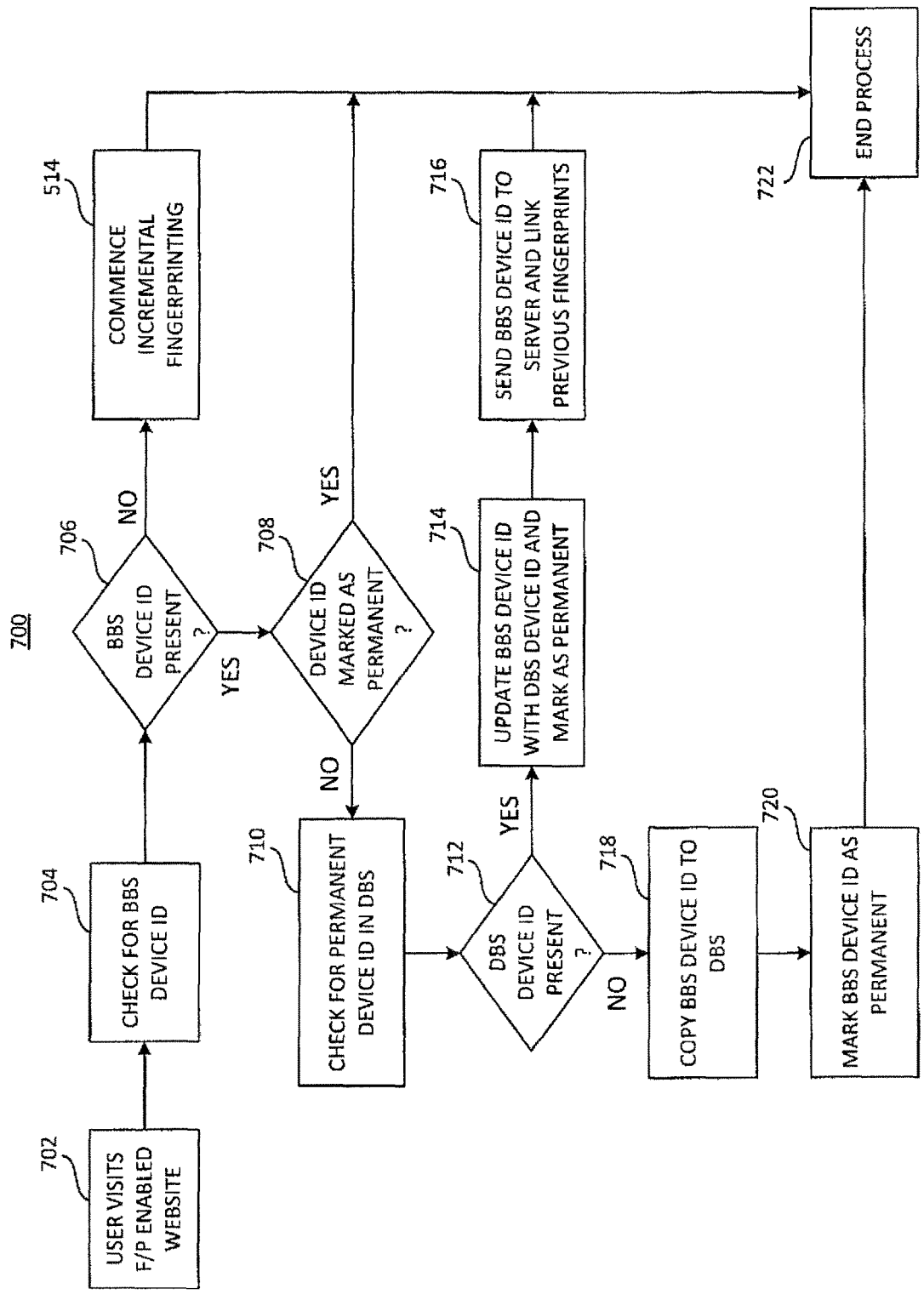
FIG. 7 is a process flow chart illustrating a method according to the invention for incremental browser-based device fingerprinting, including steps for promoting a temporary device identifier to a permanent device identifier.

FIG. 7 presents the flow chart 700 that illustrates additional process steps involved in promoting a temporary device identifier to a permanent device identifier. At the first process block 702 a user visits a web site equipped with an incremental fingerprinting program that launches an IFP to the browser of the user's computing device. The IFP executes a device identification code. In process block 704, the code checks the browser-based storage of the device for a device identifier. Next, in step 706, the process determines whether the device identifier is present. If not, the process advances to block 514 to begin the incremental fingerprinting process. When incremental fingerprinting is complete, the process ends at block 722.

If a device identifier in determined absent in block 706, decision 708 is invoked, which determines whether the device identifier is marked as permanent. If so, the process ends at block 722. If the device identifier is not marked as permanent, the process advances to block 710. Here, the IFP accesses device-based storage to check for the presence of a permanent device identifier. Next, decision block 712 determines whether a device identifier is present in device-based storage, and if so, the process moves to block 714. In block 714, the IFP updates the temporary device identifier in browser-based storage with the identifier from device-based storage, and marks the updated device identifier as permanent.

The path just described, from block 706 to block 714, addresses the scenario where a full fingerprint has been previously generated for a device using one browser, where a partial fingerprint has been generated using a second browser, and where a user at a later time opens the second browser and visits a fingerprint-enabled web page that is equipped to cause an IFP to run within the requesting browser. This time the user visits the web page long enough for the processes in blocks 710 and 712 to access device-based storage and locate the permanent device identifier. At that point, if the incremental fingerprinting process is still running, it is interrupted at block 714 when the temporary device identifier is promoted. After updating the device identifier, the process advances to block 716. Block 716 resolves the apparent problem that the device being fingerprinted may be recognizable at the remote fingerprint archive by pointing to two different recorded fingerprints—a complete fingerprint that was generated using the first browser, and a partial fingerprint that was generated using the second browser. In block 716, the newly promoted permanent device identifier is transmitted to the server (optionally, as an encrypted token) with instructions for linking or associating the complete and partial fingerprints in such a way that they are recognized as identifying the same device. In one embodiment, the partial fingerprint is erased and all data associated with the partial fingerprint in rewritten for association with the complete fingerprint that is already recorded for the device. The process then ends at block 722.

Returning now to the decision block 712, if there is no permanent device identifier present in device-based storage, the process advances to block 718. Here, the IFP copies the temporary device identifier from browser-based storage into device-based storage. For example, the temporary device identifier may be copied from DOM storage to a Flash cookie. Next, in step 720, the device identifier in browser-based storage is marked as permanent, thereby completing the promotion. The process then ends at block 722.

Figure 8:
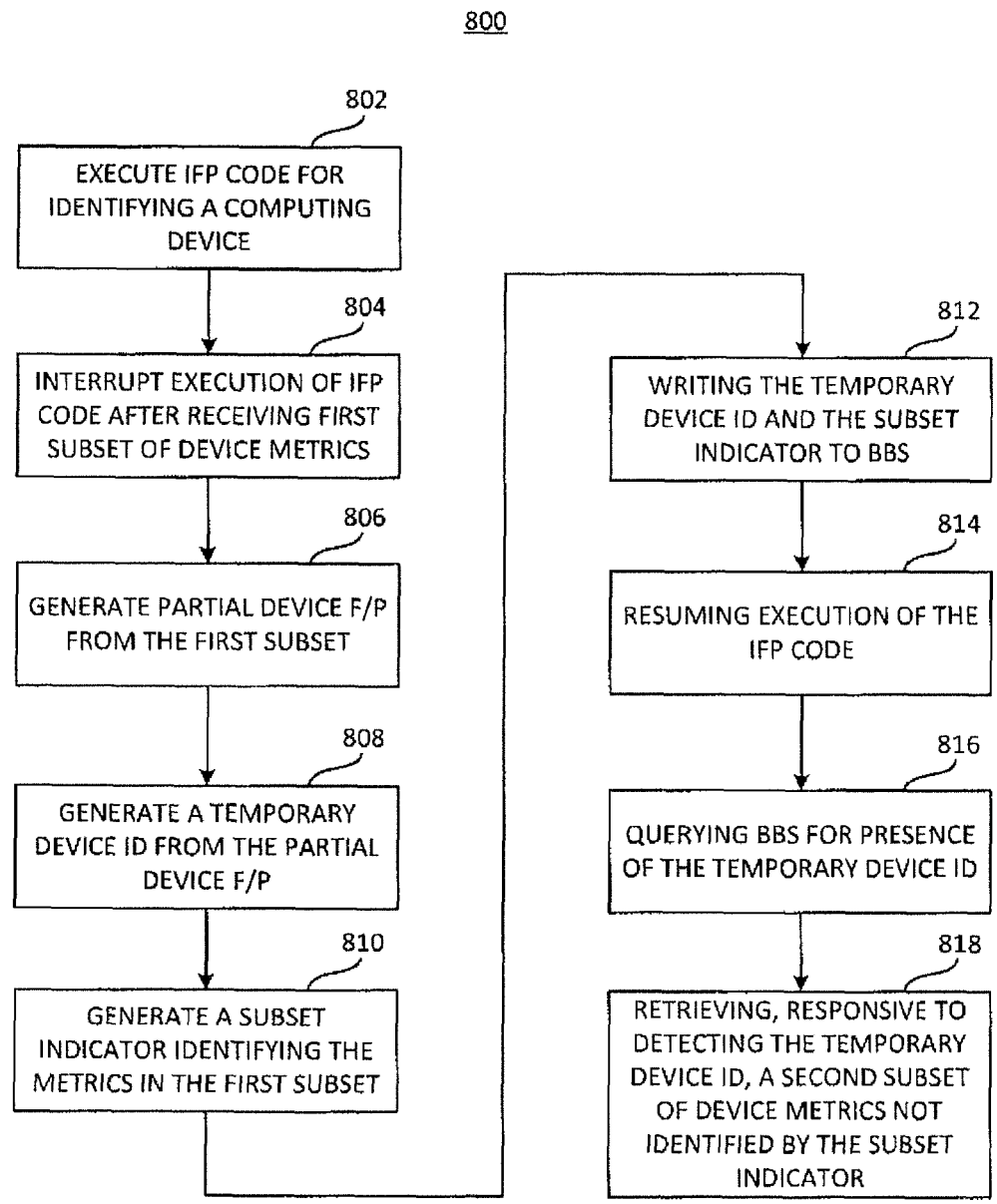
FIG. 8 is a process flow chart presenting salient steps in a method according to the invention for incremental browser-based device fingerprinting.

FIG. 8 presents a flow chart that captures the salient steps in one embodiment of a method 800 according to the invention for incremental browser-based device fingerprinting. The steps of method 800 should be interpreted in view of the various features of the invention presented in thus far.

Method 800 begins with an initial step 802, which executes a device identification code portion of an incremental fingerprinting program (IFP) running within a browser of a targeted computing device. Next, in step 804, the execution is interrupted after the IFP receives or collects a first subset of a complete set of device configuration metrics. The complete set of metrics is the minimum set needed to fingerprint a computing device so that it may be uniquely identified to within a specified accuracy. In the next step 806, the IFP generates a partial device fingerprint from the first subset of metrics. In the next step 808, the IFP generates a temporary device identifier based on the partial device fingerprint. Next, in step 810, the IFP generates a subset indicator that identifies all of the metrics that compose the first subset. Next, in step 812, the IFP writes the temporary device identifier and the subset indicator to browser-based storage within the targeted device. At a later time, in step 814, the method resumes execution of the device identification code of the IFP. Next, in step 816, the browser-based storage is queried for the presence of a temporary device identifier. In the final step 818, in response to detecting the temporary device identifier, the IFP retrieves or collects a second subset of device configuration metrics. The second subset of metrics is characterized in that no metric within the second subset is identified by the subset indicator as belonging to the first subset.

Figure 9:
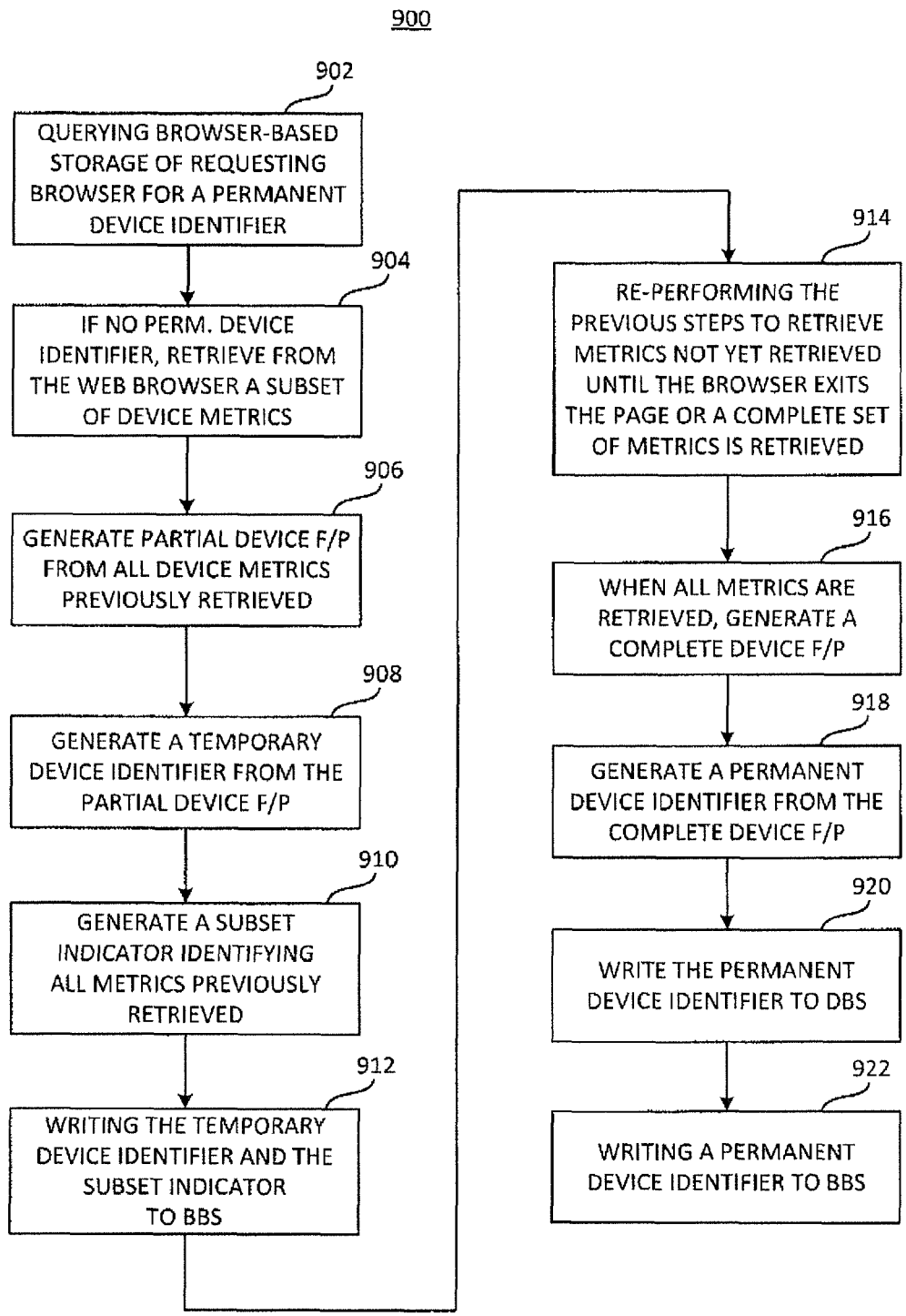
FIG. 9 is a process flow chart presenting salient steps in another method according to the invention for incremental browser-based device fingerprinting.

FIG. 9 presents a flow chart that captures the salient steps in an embodiment of a method 900 according to the invention for incremental browser-based device fingerprinting. The steps of method 900 should be interpreted in view of the various features of the invention presented in thus far.

Method 900 begins at step 902. This step begins the fingerprinting process by querying browser-based storage of a browser requesting a resource, for the presence of a permanent device identifier. The querying is understood to originate from a web page responding to the resource request. In the next step 904, if no permanent device identifier is returned as a result of the query, then a subset of a complete set of device configuration metrics needed to completely fingerprint a device to within a desired level of accuracy is retrieved from the browser. Next, in step 906, a partial device fingerprint is generated from all device configuration metrics retrieved in the previous step. Next, in step 908, a temporary device identifier is derived from the partial device fingerprint. In the next step 910, a subset indicator is generated to identify all device configuration metrics used to generate the partial device fingerprint. Next, in step 912, the process writes the temporary device identifier and the subset indicator to browser-based storage.

The next step 914 calls for all of the previous steps, i.e. 902-912, to be re-performed to retrieve additional device configuration metrics not previously retrieved, until the retrieval process is interrupted, either by the browser exiting the web page or by the process successfully retrieving the complete set of device configuration metrics. Next, in step 916, when all metrics are retrieved, the process generates a complete device fingerprint from the complete set of metrics. In the next step 918, the process generates a permanent device identifier from the complete device fingerprint, and in the following step 920, the permanent device identifier is written to device-based storage. In the final step 922, the temporary device identifier is promoted by writing the permanent device identifier to browser-based storage.

For browser-based fingerprinting, the invention addresses the problems associated with loading times and with multiple browsers residing on a common device. The invention also advantageously preserves fingerprint information in a secure location remote from computing devices fingerprinted. Local storage locations such as browser-based and device-based storage are subject to erasure and manipulation by users. Even vendor-provided identifiers such as an IP address can be spoofed by knowledgeable hackers. Fingerprinting a device according to methods of the present invention, however, provides a far more reliable and secure method of identifying devices for purposes of remote authentication. In a scenario where a device identifier is lost or modified on a computing device that was previously fingerprinted, the process presented herein may be applied to re-fingerprint the device, or to uncover an imposter. For example, if a permanent device identifier is modified by a user, a mismatch will occur at the fingerprint archive, the device will be treated as an unknown device, and incremental fingerprinting will commence with collection of the first subset of configuration metrics. When a permanent device identifier is eventually generated, it will match the permanent fingerprint previously recorded in the archive.

The methods described herein may be implemented on a variety of communication hardware, processors and systems known by those of ordinary skill in the computing arts. The various diagrams and flow charts described in connection with the embodiments disclosed herein may be implemented or performed in full or in part with a general purpose processor, digital signal processor, application specific integrated circuit, field programmable gate array, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller or state machine. A processor may also be implemented as a combination of any of the aforementioned computing devices.

The steps of a method, process, program, or algorithm described in connection with the embodiments disclosed herein may be embodied directly in hardware, in a software module executable by a processor, or in a combination of the two, e.g. as firmware. A software module may reside in memory such as RAM, ROM, EPROM, EEPROM, flash memory, registers, a hard disk, a removable disk, a CD-ROM, or another software module such as a web browser, or within any other form of storage medium known in the art for recording digital data. An exemplary storage medium may be coupled to the processor, such that the processor can read information from, and write information to, the storage medium. In the alternative, the storage medium may be integral to the processor. In a pure form, a method according to the invention may be software embodied as an electronic signal or series of electronic signals capable of being transmitted as information wirelessly or otherwise, for example, as a modulating signal receivable through a modem as a downloadable file or bit stream.

Exemplary embodiments of the invention have been disclosed in an illustrative style. Accordingly, the terminology employed throughout should be read in an exemplary rather than a limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A method for generating a fingerprint for a computing device with a web browser requesting a resource from a website, the method embodied in device-identification code executing on the computing device comprising:

(a) querying a storage of the computing device to determine the existence of a prior temporary device identifier and a prior subset indicator,
(b) identifying a subset of a complete set of device configuration metrics for the computing device, wherein if said query for a prior subset indicator is successful, said subset of device configuration metrics is not identified by the prior subset indicator;
(c) sending the subset of device configuration metrics to the website;
(d) receiving a temporary device identifier and subset indicator from the website, wherein said subset indicator identifies all device configuration metrics previously sent by the web browser to the website;
(e) writing the temporary device identifier and subset indicator to the storage of the computing device;
(f) re-performing the steps beginning at step (a) to send device configuration metrics not previously sent to the website until the web browser exits the website or until the complete set of device configuration metrics has been sent;
(g) when the complete set of device configuration metrics has been sent, receiving a permanent device identifier from the website, wherein the website grants access to the data, approves a transaction, or fulfills a resource request based upon the permanent device identifier; and
(h) writing the permanent device identifier to the storage of the computing device.

2. The method of claim 1 wherein the storage of the computing device comprises storage reserved for a Flash cookie.

3. The method of claim 1 wherein the storage of the computing device comprises one of DOM storage and HTML 5 storage.

4. The method of claim 1 wherein the temporary device identifier is a product of a hashing algorithm operating on data from the device configuration metrics.

5. The method of claim 1 wherein the subset of device configuration metrics consists of device configuration metrics that:
(i) are retrievable from the web browser within a time period specified by the website; and
(ii) provide the highest probability among all subsets satisfying condition (i) of uniquely identifying the computing device.

6. The method of claim 1 further comprising, upon receiving the temporary device identifier, identifying the computing device to website based on the temporary device identifier.

7. The method of claim 1 further comprising, upon receiving the permanent device identifier, identifying the computing device to the website based on the permanent device identifier.

8. The method of claim 1 wherein sending the subset of device configuration metrics further comprising:
(a) querying the storage of the computing device for the subset indicator identifying all device configuration metrics previously sent to the website; and
(b) sending a subset of device configuration metrics not previously sent to the website.

9. A method for incrementally fingerprinting a computing device, responsive to a web browser on the computing device requesting a resource from a website, comprising:
(a) executing device-identification code on the computing device programmed to send a complete set of device configuration metrics to the website;
(b) querying a storage of the computing device to determine the existence of a prior temporary device identifier and a prior subset indicator,
(c) identifying a subset of a complete set of device configuration metrics for the computing device, wherein if said query for a prior subset indicator is successful, said subset of device configuration metrics is not identified by the prior subset indicator;
(d) sending the subset of the device configuration metrics to the website and then interrupting execution of the device-identification code;
(e) receiving a temporary device identifier and subset indicator from the website, wherein said subset indicator identifies all device configuration metrics previously sent by the web browser to the website;
(f) writing the temporary device identifier and subset indicator to the storage of the computing device;
(g) resuming execution of the device-identification code and re-performing the steps beginning at step (b) to send device configuration metrics not previously sent to the website until the web browser exits the website or until the complete set of device configuration metrics has been sent; and
(h) receiving a permanent device identifier from the website, wherein the website grants access to the data, approves a transaction, or fulfills a resource request based upon the permanent device identifier.

10. The method of claim 9 wherein the interrupting execution of the device-identification code occurs as a result of one of (i) the web browser exiting the website, (ii) the subset satisfying a predetermined fingerprinting criteria, and (iii) expiration of an allotted execution time.

11. The method of claim 9 wherein the resuming execution of the device-identification code occurs as a result of one of (i) the web browser revisiting the website, (ii) the website fulfilling the resource request, and (iii) the website reaching a predetermined stage in its rendering sequence.

12. The method of claim 9 further comprising, upon resuming execution of the device-identification code:
(a) querying the storage of the computing device for the subset indicator, and if the subset indicator indicates that all device configuration metrics in the set have been sent to the website:
(b) omitting further retrieving steps; and
(c) promoting the temporary device identifier to a permanent device identifier by (i) marking the subset indicator as permanent, and (ii) writing the permanent device identifier to storage on the computing device.

13. The method of claim 9 wherein the storage of the computing device comprises storage reserved for a Flash cookie.

14. The method of claim 9 wherein the storage of the computing device comprises one of DOM storage and HTML 5 storage.

15. The method of claim 9 wherein the temporary device identifier is a product of a hashing algorithm operating on data from the device configuration metrics.

16. The method of claim 9 wherein the subset consists of device configuration metrics from the complete set of device configuration metrics that:
(a) are retrievable from the web browser within a time period specified by the website; and
(b) provide highest probability among all subsets satisfying condition (i) of uniquely identifying the computing device.

* * * * *